April 22, 1941.  S. D. VIGREN  2,239,510
SYSTEM FOR CHARGING A STORAGE BATTERY
Filed Feb. 10, 1939
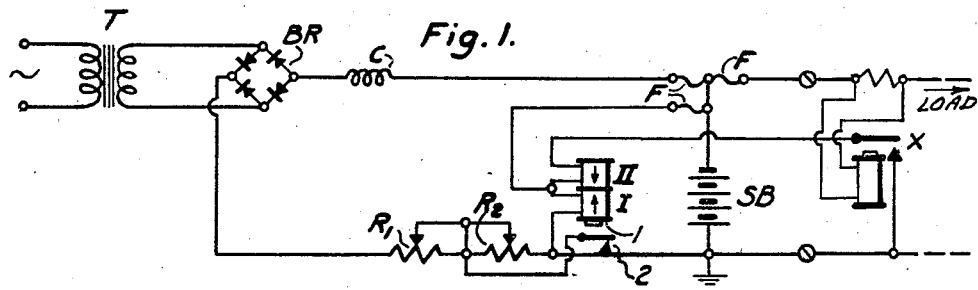
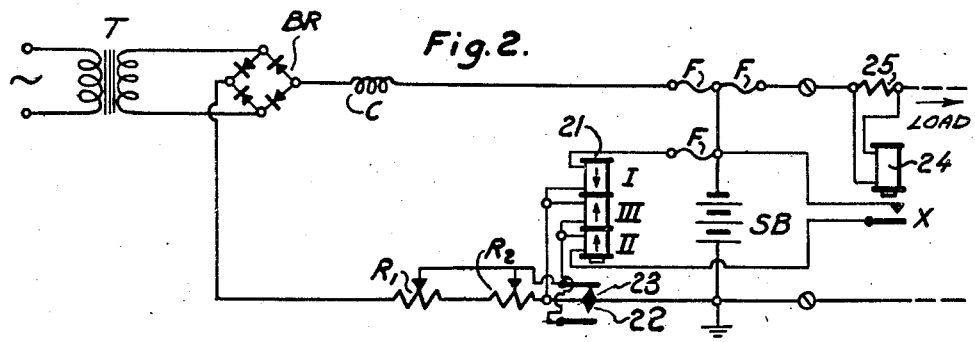
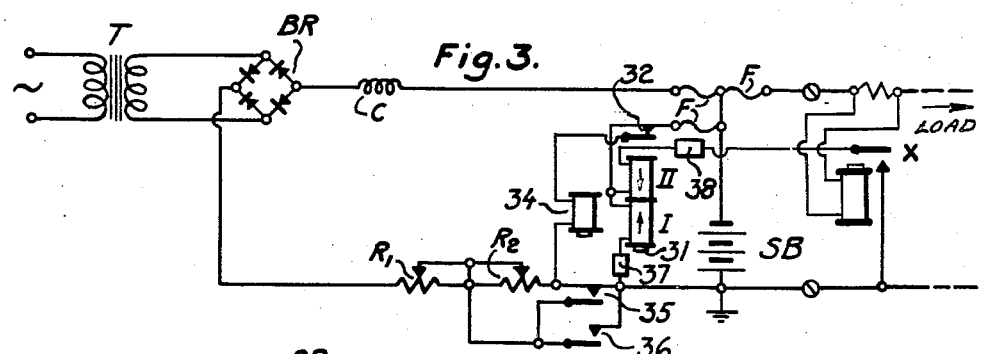
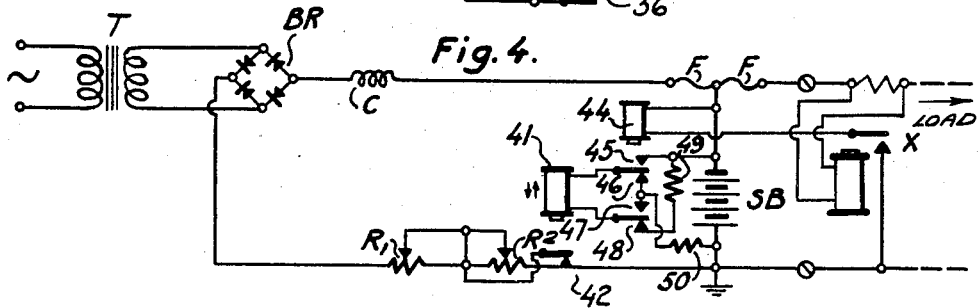
Sten Daniel Vigren
INVENTOR
his ATT'y.

Patented Apr. 22, 1941

2,239,510

UNITED STATES PATENT OFFICE 2,239,510

SYSTEM FOR CHARGING A STORAGE BATTERY

Sten Daniel Vigren, Stockholm, Sweden, assignor to Ackumulator - Fabriksaktiebolaget Tudor, Stockholm, Sweden, a joint-stock company of Sweden Application February 10, 1939, Serial No. 255,610
In Sweden April 2, 1937

8 Claims. (Cl. 171—314)

The present invention relates to means for charging storage batteries and an object of the invention is to provide a very simple device of this kind which is especially useful in telephone exchanges and the like.

It is known to use a voltage relay to control the charge of a storage battery, said relay determining whether the battery is charged at the so-called full or rapid rate of charge or receives a trickle or additional charge according to the variations of the battery voltage at different states of charge. As is well known the terminal voltage of most batteries rises during charging and if the battery, as often happens, is used to work, for instance, a telephone exchange while being charged, the variations of the terminal voltage cause difficulties.

To overcome these difficulties the voltage relay has been provided with two co-operating windings which are both energised during discharge and serve to lower the voltage limit at which the relay operates and disconnects the charging source. This voltage limit corresponds to the highest allowable working voltage of the battery. The full rate of charge is resumed when the relay releases its armature upon the voltage of the battery falling. It is, however, rather difficult to effect resumption of the full charging rate owing to the very small voltage variations during discharge of, for instance, a lead accumulator, and these variations are too small to ensure that the relay releases its armature at a predetermined state of charge. In an effort to avoid this difficulty, a time switch, for instance in the form of a thermo-contact, has been provided to temporarily open the relay circuit at predetermined intervals, whereupon the relay releases. If the voltage is high enough when the relay circuit is again closed, the relay wil reattract its armature. In this manner the state of charge of the battery is often tested and the full charging rate resumed when necessary.

The present invention has for its object to provide a very simple controlling device, by which a reliable control of the state of charge is obtained without any time switches or the like, which, of course, complicate the controlling apparatus and make it more expensive. Other important advantages are also obtained by the invention.

The invention will first be described with reference to the accompanying drawing in which a few controlling systems according to the invention are illustrated by way of example, and then the novel features thereof will be pointed out in claims.

Figures 1 to 4 are wiring diagrams of four different embodiments of the invention, respectively.

In Fig. 1 is shown the circuit arrangement of a battery charging system, comprising a storage battery SB permanently connected to consuming apparatus of any kind, not shown in the drawing, as for instance to an automatic telephone exchange. The system is connected to an A. C. current source by means of a transformer T and a bridge rectifier BR and a choking coil C is provided to form a smoothing filter in known manner. A variable resistance R1 is provided for the regulation of the full rate charging current and the resistance R1 together with the variable resistance R2 regulate the additional or trickle charge current. F are protective fuses of any known type. Further there is a voltage relay 1, having a break contact 2 and two opposing windings I and II. The winding I is permanently connected to the battery poles and the winding II is connectable in parallel with the winding I by means of a make contact X. This contact X is operated when the discharge circuit of the battery is closed, by means of a relay 24 connected in parallel to a resistance 25 in series with the consuming apparatus. The armature of the relay 24 operates the contact X, whereby the latter is closed whenever the battery supplies current to the consuming apparatus and opened whenever the discharge circuits are opened.

The windings I and II of the relay 1 are dimensioned in the following manner. If the contact X is open, i. e. only the winding I is magnetized, the relay 1 operates its armature, breaking the contact 2, only if the battery voltage has a value corresponding to fully or substantially fully charged battery at rest. For an 18 cell lead accumulator this value is about 45 volts. The winding II opposing the winding I has more ampere turns and when the contact X is closed, both windings being connected in parallel to the battery poles, the relay 1 is first caused to release its armature as the windings are opposing and then to test the battery voltage by means of both windings in parallel. The winding II has now so many ampere turns in relation to the winding I that the relay operates its armature if the battery has the highest allowable working voltage. For an 18 cell lead accumulator 39 volts is usually determined to be the highest allowable working voltage, for instance in a 36 volt automatic telephone exchange.

If contact X is opened again, the winding II is disconnected from the battery poles, the relay releases its armature and is caused to test the battery voltage by means of its winding I alone, operating the relay again only if the battery voltage corresponds to fully or substantially fully charged battery (45 volts as per above).

Thus every time the contact X is closed or opened the relay 1 is caused to test the battery voltage with its armature in its resting position, then operating its armature only if the battery voltage has reached one of the two alternative values, the higher if the contact X is open, the lower if the contact X is closed.

As is obvious from the diagram, the charging current passes the resistances R1 and R2 in series when the contact 2 of the relay 1 is open but only the resistance R1 when the said contact is closed. In the first case the battery SB is passed by the so called additional or trickle charge current in the second case by the full rate charging current.

In practice, this means that the battery is charged at the full rate as often as possible and that parallel or buffer supply service is used as long as the battery voltage is lower than the highest allowable working voltage of the battery (39 volts) which, as is well known, is economically advantageous. As is easily understood the contact X will be operated several times during 24 hours and each time the battery is tested. This means that in an automatic telephone exchange the battery voltage very seldom falls much below the highest allowable working voltage limit and that the full charging rate is always available after the last call in the evenings, so that the battery will always be fully charged in the mornings.

In the charging device, diagrammatically shown in Fig. 2 and differing not very much from the system described above, the voltage relay 21 is provided with an auxiliary winding III, cooperating with the winding II, the latter opposing the winding I and being arranged in the same manner as in Fig. 1. The relay 21 is provided with two contacts 22 and 23, arranged as make and break contacts in known manner. The contact 23 corresponds to the contact 2 in Fig. 1 connecting and disconnecting the full rate current as per above. The contact 22 is provided, when closed, to cut out the auxiliary winding III, whereby the relay is made more sensitive with respect to the release voltage, so that the relay releases its armature at a voltage, the value of which can be made very close to that at which the relay operates its armature.

As may be understood, it is at least theoretically possible that should the contact X remain closed long enough when the full charging rate has been interrupted, the battery voltage may fall below the normal battery voltage by reason of the continuous discharge, as the said normal voltage of a lead accumulator is very close to the voltage limit corresponding to a fully charged battery, these voltages being 36 and 39 volts respectively in the case of an 18 cell storage battery. A relay according to Fig. 2 can be relied on to release at the lower voltage and operate at the higher limit.

In Fig. 2, the contact X, which is operated by the armature of relay 24 connects the two windings II and III in parallel to the battery poles, the winding III being cut out by means of the contact 22 upon the operation of the relay 21.

In the charging battery system according to Fig. 3 a voltage relay 31 of the same type as in Fig. 1 is used in combination with an auxiliary relay 34, the latter being provided with two contacts 35 and 36, connected in parallel to control the charging current in the same manner as contacts 2 and 23 as per above. If necessary any of these contacts may be mercury contacts.

In Fig. 3 the windings I and II of the relay 31 are connected in series with special resistances 37 and 38 in order to obtain a reliable compensation of temperature both with respect to the consuming apparatus, in which the resistances vary upon varying temperature and with respect to the battery voltage, which also varies upon varying temperature, but in a noncompensation manner. If the resistance 37 has a temperature coefficient corresponding to the variation of the voltage of the battery caused by the variations of temperature a compensation is obtained with respect to the operation of the relay by means of the winding I, i. e. when the contact X is open. If lead cells are used the temperature coefficient must be negative and so called "Urdox" resistances (uranium-di-oxide, titanium-oxid) may for instance be used. When the said contact is closed the winding II in series with the resistance 38 of the same material as the resistance 37 is connected in parallel with the winding I to the battery poles. As the two windings oppose each other the effects of the resistances 37 and 38 neutralize each other and if the windings I and II are made of the same material and in the same way as in the apparatus of supply, so that the resistances of these windings vary in the same manner as in the consuming apparatus, a compensation of temperature is obtained also with respect to the consuming apparatus, when they are in use.

As is obvious from the above description, the voltage relay is caused to release its armature upon every operation of the switching means controlled by the consuming apparatus or the discharge current, i. e. the contact X, and to test the battery voltage with its armature in its resting position. Further on the voltage limits at which the voltage relay attracts its armature are altered in dependance of the said X contact, so that the relay operates its armature at a higher voltage limit when the consuming apparatus are at rest and at a lower limit when the battery discharges into said apparatus. Thus the full rate charging current is interrupted at two alternative voltage values by means of the same voltage relay.

These main principles of the invention can also be carried out by means of two relays, as shown in Fig. 4, the voltage relay, 41, being provided with only one winding. In this case an auxiliary relay 44 is made operable in accordance with the operations of the contact X as is shown in the diagram. This relay 44 is provided with two sets of make and break contacts 45, 46, 47 and 48 which are connected in series with the winding of the voltage relay 41 and resistances 49 and 50 to the battery poles. When the consuming apparatus are at rest the contact X is open and relay 44 is at rest. Now current passes through the battery SB, the resistance 49, contact 48, the winding of relay 41, contact 46, the resistance 50 and back to the battery SB. The relay 41 must now be adjusted to operate its armature at the higher battery voltage limit, for instance 45 volts, when the battery has 18 lead cells.

When the contact X is closed relay 44 operates its armatures, breaking the contacts 46 and 48 and closing the contacts 45 and 47, thus causing a magnetic reversal to take place in the relay 41, whereby the latter, if closed, releases its armature. Now current passes from the battery SB over contact 45, through the winding of the relay 41 in the opposite direction, contact 47 and the resistance 50 back to the battery SB. Thus the resistance 49 is cut out upon the operation of relay 44, and now the voltage relay in series only with resistance 50 attracts its armature at the lower voltage limit of the battery, 39 volts if the battery is an 18 cell lead accumulator. The voltage relay 41 is provided with a contact 42, controlling the charging current and connecting and disconnecting the variable resistance R2, as described above. A compensation of temperature variations can be obtained by means of the resistance 49 if this resistance is chosen in the same manner as the resistances 37 and 38 in Fig. 3.

As for the switching means, operable in accordance with the working conditions of the consuming apparatus, the so called X contacts as per above, it may be pointed out that it is possible to provide more than one X contact within the consuming apparatus, especially if the latter consists of an automatic telephone exchange or the like, having a great number of parts and components.

Such extra contacts may be arranged, for instance, within different components of a consuming apparatus and in such a manner that the testing of the battery is made more frequent. These co-operating contacts X may be arranged in groups and/or multiplicated within those parts of the apparatus which do not operate at the same time. For instance, in the form of make and break contacts, the break contacts of which are connected in series, the make contacts being connected to one pole of the battery and the make and break contacts being adjusted to be break before make contacts.

As will be understood from the accompanying drawing and the above description, a very simple controlling device may be provided by the invention; in Fig. 1 for example only one relay with only one movable switch contact is needed, and the device operates in a very reliable manner to control the voltage without any auxiliary relays or switches.

The invention also provides other important advantages. Due to the frequent magnetic reversals of the relay, remanance or residual magnetism does not occur as a source of trouble, as is always the case when a voltage relay is provided with only one or with two or more assisting windings, and in consequence of which the voltage limit at which a relay operates varies in a detrimental manner as the quantity of residual magnetism varies.

Finally, as an example, the dimensioning of a voltage relay according to the invention as illustrated in Figs. 1-3 and adjusted to control the charging of an 18 cell lead accumulator (36 volts) will be described.

The coil I is provided with 11,000 windings, having a resistance of 1470 ohms. This coil gives about 290 ampere turns if the voltage is 39 volts and about 340 ampere turns at 45 volts.

The coil II, eventually together with the auxiliary coil III, is provided with 12,000 windings, 750 ohms. These coils must oppose the coil I as per above and they give about 625 ampere turns if the voltage is 39 volts.

Further on the voltage relay is adjusted to attract its armature when the resulting ampere turns are about 330.

To operate this voltage relay the coil I alone must have 45 volts but the two or three coils at the same time 39 volts. In the last mentioned case the ampere turns of the coils II and eventually III have to neutralize the 290 ampere turns of the coil I, the resulting ampere turns being 335, which is enough to operate the relay. Further on the relay, due to the magnetic reversals, is caused to release its armature, if attracted, upon every connection and disconnection of the winding II (and III).

Although herein are shown and described only a few forms of apparatus embodying this invention, it is understood that various changes and modifications may be therein within the scope of the appended claims without departing from the spirit and scope of the invention.

Having thus described this invention, what is claimed is:

1. In a system for charging a storage battery connected to consuming apparatus, the combination with a full rate current charging circuit, a normally closed switch device connecting said charging circuit with the battery, a voltage relay including an armature controlling said switch device so as to open said charging circuit when the armature is attracted by the relay, and a first circuit connecting the battery with said relay when the consuming apparatus is at rest, said relay, when connected with the battery solely by said first connecting circuit being adapted to attract its armature upon rising of the battery voltage above a predetermined maximum, of a second normally open circuit for connecting said relay with the battery to pass a current through said relay in a sense opposite to that of the current transmitted by said first connecting circuit and to effect a magnetic reversal in the relay, and a load current controlled switch for closing said second circuit when the battery discharges into the consuming apparatus, said second connecting circuit being adapted to change the characteristics of the relay in such a manner that, after the magnetic reversal and as long as load current is flowing, the armature is attracted and the charging circuit is opened at a predetermined battery voltage lower than said maximum voltage.

2. A system, as claimed in claim 1, in which said predetermined maximum voltage corresponds substantially to the voltage of the fully charged battery and said predetermined lower voltage corresponds substantially to the highest allowable working voltage of the battery.

3. A system, as claimed in claim 1, in which said relay comprises more than one coil, said first connecting circuit connecting the battery permanently with one of said coils and said second connecting circuit containing a second coil.

4. A system, as claimed in claim 1, in which said relay comprises a single coil for cooperation with both said connecting circuits, said load current controlled switch being adapted to open said first connecting circuit, as it closes the second connecting circuit.

5. A system, as claimed in claim 1, in which said first connecting circuit contains a resistance having a negative temperature coefficient to vary said predetermined maximum voltage in correspondence with the variation of the battery voltage upon temperature variations, said second connecting circuit being adapted to render said resistance ineffective whenever the battery discharges into the consuming apparatus.

6. In a system for charging a storage battery connected to consuming apparatus, the combination with a full rate current charging circuit, and a normally closed switch device connecting said charging circuit with the battery, of a voltage relay including two opposing coil units and an armature controlling said switch device so as to open said charging circuit when the armature is attracted by the relay, a first circuit permanently connecting one of said coil units with the battery, said first coil unit being dimensioned in relation to its connecting circuit to yield at a predetermined maximum battery voltage independently from the second coil unit a magnetomotive force sufficient to attract said armature, a second normally open circuit for connecting said second coil unit with the battery parallel to said first coil unit, and load current controlled switch means for closing said second connecting circuit when the battery discharges into the consuming apparatus, said second coil unit being dimensioned in relation to its connecting circuit to yield at a predetermined battery voltage lower than said maximum voltage a magnetomotive force sufficiently exceeding the opposed magnetomotive force produced at said lower battery voltage by said first coil unit to effect attraction of the armature at said lower battery voltage, whereby, upon each opening and closing of the battery discharge circuit, first a magnetic reversal takes place in the relay and then the relay is adjusted to attract its armature at the maximum voltage when the consuming apparatus are at rest or at said predetermined lower voltage when the battery discharges into the consuming apparatus.

7. A system, as claimed in claim 6, in which said first connecting circuit comprises in series with said first coil unit a resistance having a negative temperature coefficient to vary said predetermined maximum voltage in correspondence with the variation of the battery voltage upon temperature variations, and said second connecting circuit comprises a corresponding resistance to neutralize said first mentioned resistance whenever the battery discharges into the consuming apparatus.

8. In a system for charging a storage battery connected to consuming apparatus, the combination with a full rate current charging circuit, a normally closed switch device connecting said charging circuit with the battery, a voltage relay including a coil and an armature controlling said switch device so as to open said charging circuit when the armature is attracted by the relay, and a first normally closed circuit connecting the battery with said coil and passing the current through the latter in one direction, said first circuit including an ohmic resistance, said coil being dimensioned relative to said first connecting circuit to effect attraction of said armature when the battery voltage rises above a predetermined maximum, of a second normally open circuit for connecting the battery with said coil, said second circuit passing the current through said coil in a direction opposite to that of the current supplied by said first connecting circuit and shunting said resistance, and load current controlled switch means for opening said first connecting circuit and closing said second connecting circuit when the battery discharges into the consuming apparatus thereby effecting a magnetic reversal in the coil and causing attraction of said armature at a predetermined battery voltage lower than said maximum voltage.

STEN DANIEL VIGREN.